United States Patent [19]
Remick

[11] Patent Number: 5,127,455
[45] Date of Patent: Jul. 7, 1992

[54] DRIVE AXLE TRUCK TIRE

[75] Inventor: Edward M. Remick, Taylors, S.C.

[73] Assignee: Michelin Recherche et Technique, Fribourg, Switzerland

[21] Appl. No.: 590,303

[22] Filed: Sep. 28, 1990

[51] Int. Cl.$^5$ .............................................. B60C 11/04
[52] U.S. Cl. ................................................ 152/209 R
[58] Field of Search .......... 152/209 R, 209 D, 209 A, 152/209 R

[56] References Cited

U.S. PATENT DOCUMENTS

| D. 312,809 | 12/1990 | Clark et al. | D12/147 |
| D. 312,809 | 12/1990 | Clark et al. | D12/147 |
| 3,237,669 | 3/1966 | Travers | 152/209 |
| 4,122,879 | 10/1978 | Takigawa et al. | 152/209 R |
| 4,177,850 | 12/1979 | Ogawa et al. | 152/209 R |
| 4,186,788 | 2/1980 | Pommier | 152/209 B |
| 4,284,115 | 9/1981 | Ohnishi | 152/209 R |
| 4,311,179 | 1/1982 | Hayakawa et al. | 152/209 R |
| 4,796,683 | 1/1989 | Kawabata et al. | 152/209 R |

FOREIGN PATENT DOCUMENTS

| 0296605 | 12/1988 | European Pat. Off. | 152/209 R |
| 0100503 | 9/1978 | Japan | 152/209 R |
| 0177703 | 10/1983 | Japan | 152/209 D |
| 0106115 | 5/1988 | Japan | 152/209 R |
| 0134315 | 6/1988 | Japan | 152/209 R |
| 0022602 | 1/1989 | Japan | 152/209 R |
| 2231538 | 1/1970 | United Kingdom | 152/209 R |
| 1195241 | 6/1970 | United Kingdom . | |
| 1374992 | 11/1974 | United Kingdom . | |

OTHER PUBLICATIONS

"Tire Design Guide 1985", p. 182 Michelin Xm+S4.

Primary Examiner—Michael W. Ball
Assistant Examiner—Nancy T. Krawczyk
Attorney, Agent, or Firm—Robert R. Reed

[57] ABSTRACT

Significant improvements in heavy and medium duty truck tire wear and endurance are a result of this drive axle tire tread design. The traction and center tread blocks are shaped to give a uni-directional sculpture where the blocks and zigzag grooves regress from the mid-circumferential plane with forward rotation of the tire. The polygonal shaped traction tread blocks have a leading face with a lead slope angle (with respect to a normal from the surface area) greater that the trail slope angle of the trailing face. The lateral groove bottom surface configuration is a circle in the plane parallel to the principal tangential stresses on the surface area of the traction tread block due to a tractive effort of driving or braking. The result is a drive axle tread design with a uniform wear pattern, improved wear rates and improved endurance from groove fatigue while maintaining high levels of snow, wet and dry traction, rolling resistance, casing endurance, and noise abatement.

4 Claims, 4 Drawing Sheets

DRIVE AXLE TRUCK TIRE

TECHNICAL FIELD

The present invention relates to the improvements in treads of tires used for heavy vehicles, including but not limited to medium and heavy duty trucks, buses and off-road vehicles. In particular it concerns the shape of the traction tread blocks and the lateral grooves for improved wear and endurance.

BACKGROUND OF THE INVENTION

Dunlop GB 1195241 patent relates to the slope of leading (butress) face of a farm tractor tire traction bar having a greater angle (slope) with respect to the radial direction with respect to the tire than the same angle for the trailing face of the traction bar. The load applied to the leading edge at contact with the surface is spread to bear over a larger area reducing the distortion and deflection of the casing and traction bar. The trailing edge being less supported than the leading edge results in less bar movement over the ground as it moves out of contact and, therefore, less wear. Both the leading and trailing faces are arranged to blend in a smooth curve with the rubber at the base of the tread by utilizing a relatively large radius of curvature. In an improvement patent GB 1374992 by Dunlop, the relative inclination of the leading face with respect to the trailing face was changed so that they were approximately equal at the shoulder region. This improvement was made to increase the resistance of the tread bar to shoulder wear caused by the concentration of lateral cornering forces in this region. Once again, a relatively large radius (25 mm to 30 mm) was used along the whole length of the tread bar to blend in a smooth curve with the rubber at the base of the bar.

In comparison with the two patents above, Pommier in his patent U.S. Pat. No. 4186788 shows traction bars adjacent the circumferential plane of symmetry having a leading edge with an abrupt slope (smaller angle with respect to the radial direction) and a gentle slope (larger angle) for the trailing edge. In contrast, at the shoulder region it reverses to a gentle slope on the leading edge and an abrupt slope on the trailing edge. Angles of 0° to 8° with respect to the radial direction were used for abrupt slopes and 6° to 20° were used for gentle slopes. Improved adherence properties were quoted, which are preserved as wear progresses. The leading and trailing faces show an abrupt change (small radius) at the base of the tread in this patent by Pommier (FIG. 2 of U.S. Pat. No. 4186788).

For the drive axle traction tires of heavy duty trucks, the contact surface ratio must be adequate to support large vertical loads. Therefore, truck tire traction bars become tread elements closely spaced together in a circumferential direction. Also, for convenience in using a truck tire at any wheel position, with either forward or backward rotation, these tires are classically non-directional tread designs. In contract, the farm tractor tires referenced above are unidirectional designs with their forward rotation specified. When tread elements are closely spaced for a proper contact surface ratio there is not sufficient groove width for the lateral grooves to have (1) the desired leading face and trailing face slopes with respect to the radial direction, (2) the adequate groove depth for proper traction throughout the tire's life and (3) a smooth transition at the base of the tread element without a compromise of tread design parameters.

The patent U.S. Pat. No. 4284115 by Ohnishi addressed the compromise in tread design for a bias heavy duty tire by setting the slope (slant angle) of the groove walls and the curvature of the grooves between walls (leading and trailing faces) and the bottom thereof within a specified range. The groove width being reduced at the bottom of the grooves substantially increases the probability of cracks. Ohnishi shows a larger transition radius between the groove bottom and the leading face than between the groove bottom and the trailing face to reduce cracking. Ohnishi also shows the slope of the leading face of the lateral groove having an angle (slope) with respect to the radial different than that of the trailing face. However, for this bias non-directional tread design the leading face has a larger angle than the trailing face on one side of the centerline portion of the tread and a smaller angle than the trailing face on the other side. Decreasing angles from the shoulder to the centerline are also disclosed for a smooth transition from one side to the other. A combination of the variable radius groove bottom contour and the difference in the slope of the leading and trailing faces in one tread design was not disclosed in this patent. Also, test results were given for large off-road or earthmover tires only.

This background information does not teach one skilled in the art how to design the tread of a drive axle tire. Conflicting solutions were obtained to solve different problems.

SUMMARY OF THE INVENTION

With the results of sound analytical and experimental investigations, the tread design invention wherein disclosed has been shown to have significant improvements in heavy & medium duty truck tire wear at high levels of snow, wet and dry traction, rolling resistance, casing endurance and noise abatement. An unidirectional tread design having lateral grooves with the leading face of traction bars (blocks) having a slope angle with respect to the radial direction larger than the slope angle of the trailing face of said blocks. Tread blocks are the result of circumferentially oriented grooves that cut the traction bars into polygonal shaped blocks for better water evacuation and tread mobility as well as improved contact stress distribution and carcass endurance.

To provide a lateral groove with proper resistance to fatigue at the base of the groove, the invention discloses a contour of the base having the largest single radius possible in a plane aligned with the tangential traction stress. This plane is nominally parallel to the mid-circumferential plane of symmetry of the tire. With an oblique lateral groove with respect to this circumferential plane, the shape of the base of the groove perpendicular to the axis of the groove becomes an ellipse. This tread design will result in improved resistance to fatigue at the bottom of the lateral groove for driving torques at the drive axle.

The tread design of the preferred embodiment is illustrated, discussed and described below. It concerns one embodiment not limiting the scope of the invention. Orientation of the lateral and circumferential grooves and the definition of tread blocks so generated by said grooves can be altered and still remain within the scope of this invention. Furthermore, the type of vehicle can be any similar vehicle with a high driving torque axle including buses, light trucks, off-road vehicles and the like.

BRIEF DESCRIPTION OF THE DRAWINGS

One embodiment of the invention will now be described, by way of illustration and not of limitation, with reference to the accompanying drawings, in which.

DETAILED DESCRIPTION AND PREFERRED EMBODIMENTS

Figure 1:
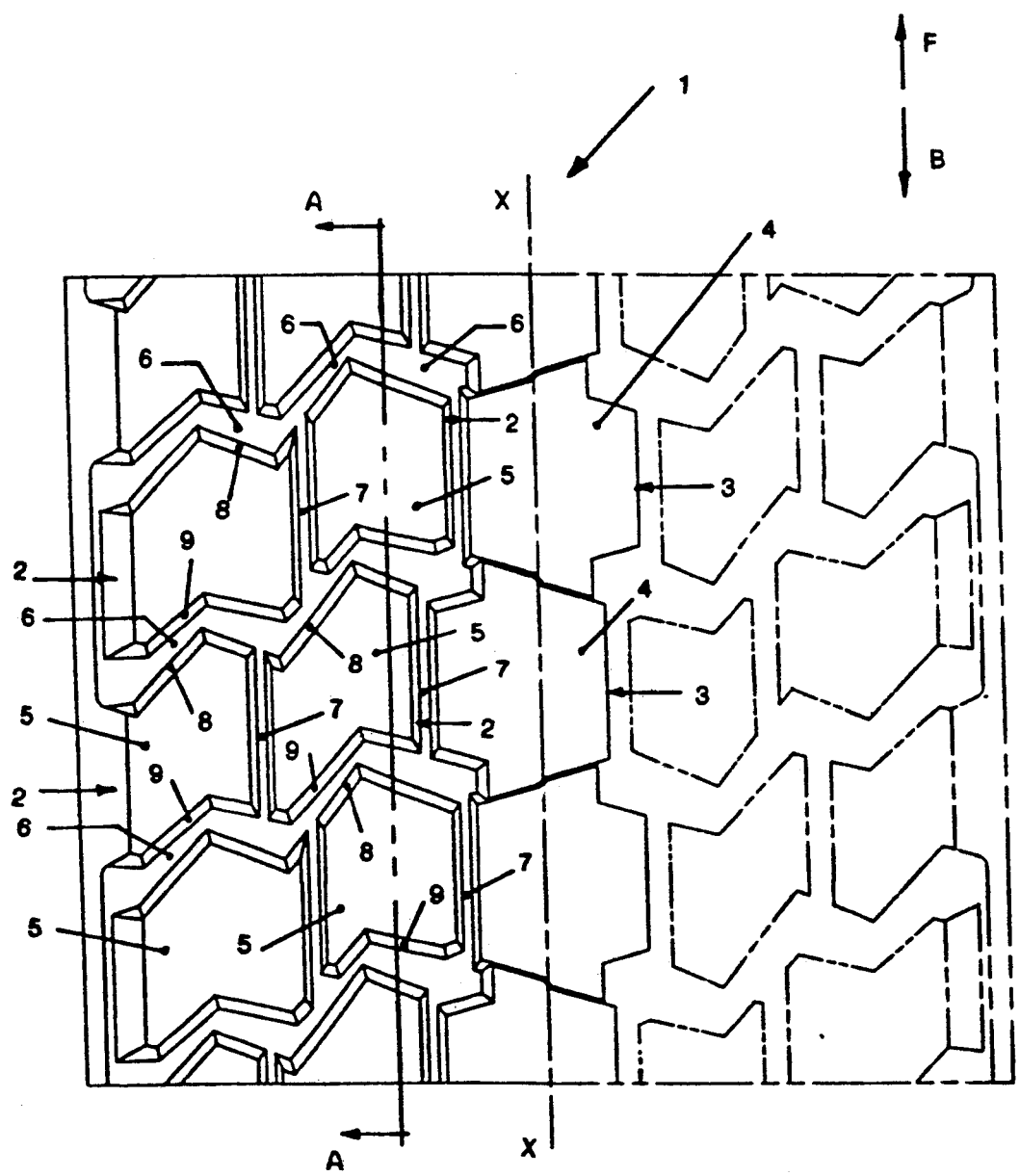
FIG. 1 is an illustration of a segment of the top view of a tire showing a non-directional tread design.

The non-directional tread design 1 is illustrated in FIG. 1. The tire with this sculpture pattern can be rotated in the forward F direction or the backward B direction with no difference in how the tread design 1 contacts the surface of the ground or roadway. The center tread blocks 3 reverse in orientation and the traction tread blocks 2 are repeated with an opposite orientation on each side of the mid-circumferential plane X—X. Traction tread blocks 2 are shown as dashed lines on one side of the mid-circumferential plane X—X in FIG. 1 to simplify the illustration. Surface areas 4 of the center tread blocks 3 and surface areas 5 of the traction tread blocks 2 define the possible contact surfaces of the tread design 1.

Lateral grooves 6 have a zigzag configuration for this tread design 1. The longitudinal grooves 7 are straight line segments essentially parallel to the mid-circumferential plane X—X. Lateral grooves 6 and longitudinal grooves 7 define the polygonal shaped traction tread blocks 2. Alternative lateral groove and longitudinal groove configurations, including discontinuous line segments and curvilinear segments, are also within the scope of this invention.

In the forward F rotation of the tire the leading face 8 of the traction tread block 2 is the area, along with surface area 5, that defines the configuration of the tread block 2 at the time it initially impacts the ground or roadway. The trailing face 9 of the traction tread block 2 is the area, along with the surface area 5, that defines the configuration of the tread block 2 as it releases from the ground or roadway.

To maintain the non-directional feature of this tread design 1 it is desirable that the angle which the leading face 8 makes with a normal to the surface area 5 be equal to the angle the trailing face 9 makes with this same surface area 5. Therefore, when the tire has a backward B rotation there is no change in the configuration at tread block 2 contact or release. Within the scope of this invention, the leading face 8 can have a larger angle with respect to the normal to the surface area 5 than the trailing face 9 and thereby have improved tire wear and endurance for this tread design 1. However, there are significant problems in making the end user mount the tires for correct rotation, because its general appearance is non-directional.

It is possible to maintain the tire as non-directional in design by sloping the leading face 8 on first side of the mid-circumferential plane X—X the same as the trailing face 9 on the second side of plane X—X, and then reversing this so the trailing face on the first side has the same slope as the leading edge on the second side. The referenced patent by Ohnishi suggests this. The problem with this approach is that the improvements in wear or traction on one side, due to the leading face slope being different than the trailing face slope, are lost on the other side.

The non-directional tread design 1 is discussed in more detail below when the sectional view along line A—A is discussed as FIG. 3.

Figure 2:
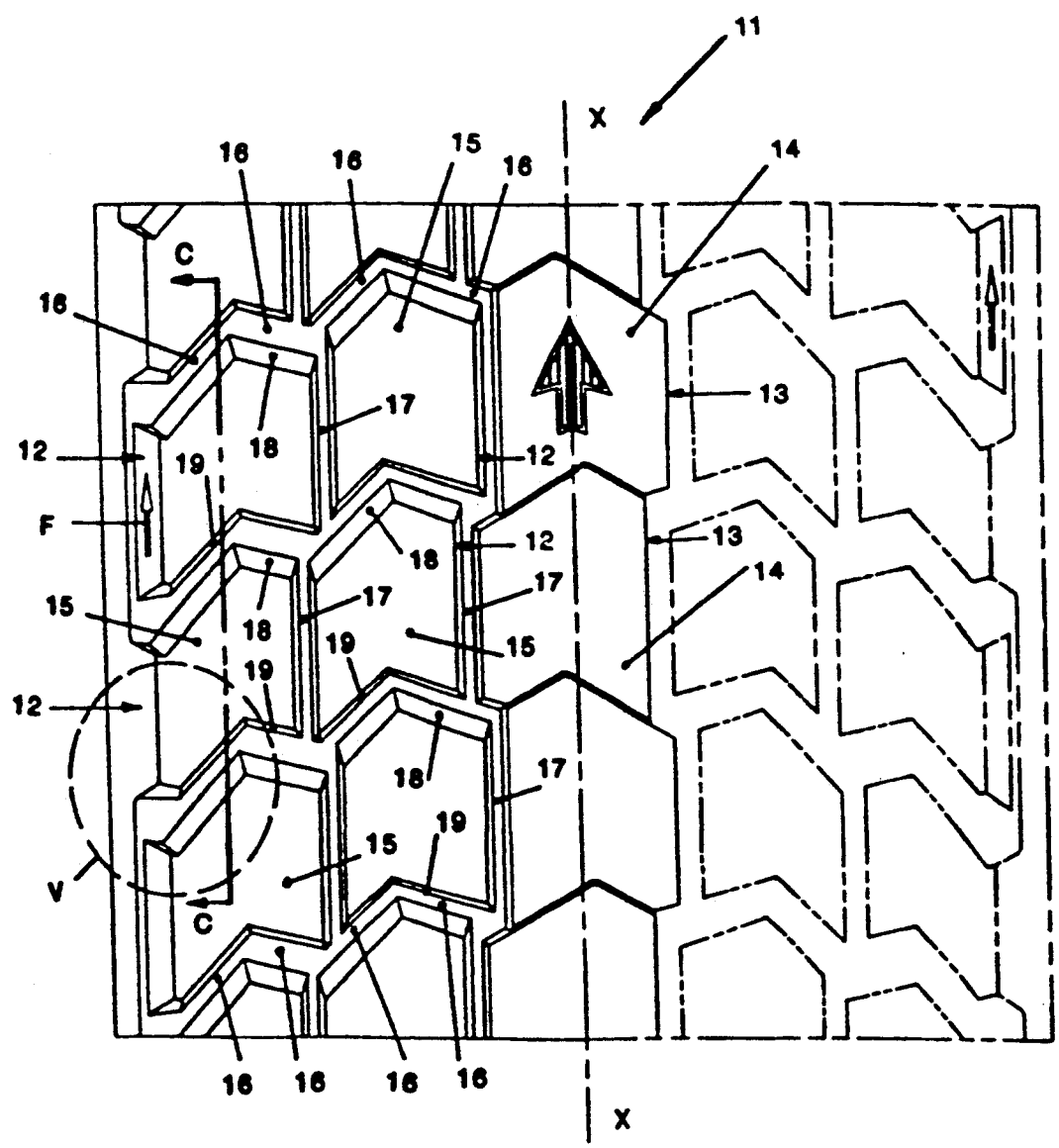
FIG. 2 is an illustration of a segment of the top view of a tire showing the preferred embodiment as a uni-directional tread design.

The uni-directional tread design 11 is illustrated in FIG. 2. The direction of rotation for this sculpture pattern must be specified by a forward F rotation marked on the tire so that the tread design 11 comes into contact with the ground or roadway in a controlled manner for improved performance. The center tread blocks 13 as well as the traction tread blocks 12 have a definite orientation in regard to the forward F arrow. The traction tread blocks 12 have the same orientation on both sides of the mid-circumferential plane X—X. Traction tread blocks 12 are shown as dashed lines on one side of the mid-circumferential plane X—X to simplify the illustration. Surface areas 14 of the center tread blocks 13 and surface areas 15 of traction tread blocks 12 define the possible contact surfaces of the tread design 11.

The ratio of the surface areas 14 and 15 in contact with the ground or roadway at one time (with a rated tire load) to the total contact patch area is termed the contact surface ratio (CSR). This ratio will be discussed in more detail below.

The lateral grooves 16 have a zigzag configuration for this tread design 11. The longitudinal grooves 17 are essentially straight line segments parallel to the mid-circumferential plane X—X. Lateral grooves 16 and longitudinal grooves 17 define the polygonal shaped traction tread blocks 12. Alternative lateral groove and longitudinal groove configurations, including discontinuous line segments and curvilinear segments, are also within the scope of this invention. The length, width and configuration of all grooves 16 and 17 define the surface areas 14 and 15 which determines the CSR.

The tread design 11 being a uni-directional tread design permits other design features within the scope of this invention not possible with a non-directional tread design. The traction tread blocks 12 are arranged in pairs to slope backward (regress) from the mid-circumferential plane X—X on both sides with this tread design 11. This is a typical configuration for farm tractor tire traction bars, as referenced above. An alternative tread design is to slope a plurality of traction bars forward (progress) with respect to mid-circumferential plane X—X. Such a tread design was investigated by the inventor by simply reversing the direction of rotation of the tire with tread design 11. Test results for both the forward F and backward rotation of tread design 11 are given below.

The relative slope of the leading face 18 of the traction tread block 12 with respect to the slope of the trailing face 19 of the traction tread block 12 can also be changed with this uni-directional design. For the tread design 11 of FIG. 2 with the tire rotating forward F, the angle which the leading face 18 of traction tread block 12 makes with a normal to the surface area 15 is greater than the angle which the trailing face 19 of traction tread block 12 makes with a normal to the same surface area 15. An alternative tread design is to make the same angle of the leading face 18 less than the angle of the trailing face 19. The tread design 11 compared with this alternative was investigated by the inventor and test results for the relative slope of the leading face 18 with respect to the trailing face 19 for this uni-directional design are given below.

A third design possibility for the uni-directional tread design is to shape the bottom of the grooves 16 and 17 to improve tire endurance. A common problem with drive axle traction tires is fatigue cracking at the base of the grooves. Alternative groove bottom configurations are discussed below.

The uni-directional tread design 11 is discussed in more detail below when the sectional view along line C—C is discussed with FIG. 4 descriptions.

The traction tread blocks 12 have the preferred polygonal shape illustrated in FIG. 2 to give advantages over alternate shapes. A uniform heel to toe wear is obtained with this block shape as a results of its good length, in the circumferential direction, to its width, in the lateral direction, ratio. This shape also allows the CSR to be large and still maintain excellent wet and dry traction capability. This shape having more aesthetic appeal than parallelograms or quadrilaterals is also an advantage for commercial reasons.

Figure 3:
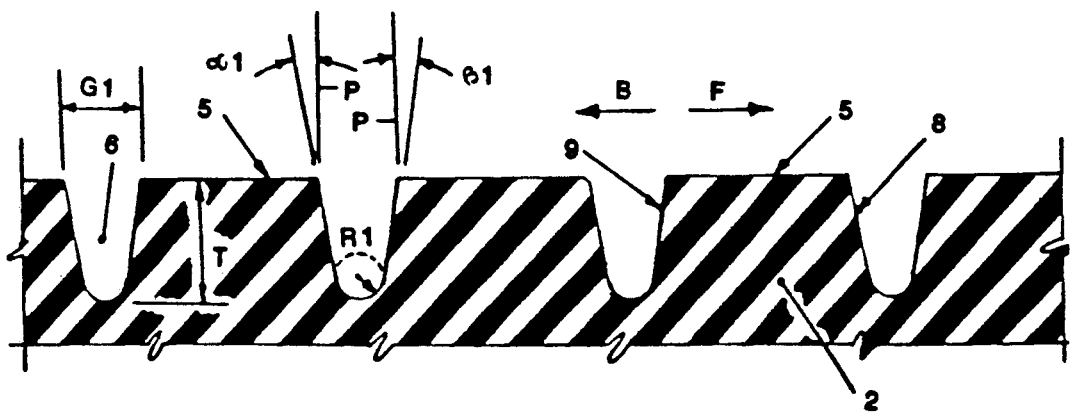
FIG. 3 is a sectional view of the tread area segment along line A—A parallel to the mid-circumferential plane X—X for the non-directional tread design of FIG. 1.

The sectional view of FIG. 3 shows more details on the configuration of the traction tread blocks 2 and their associated lateral grooves 6 for the non-directional tread design 1. The sectional view of FIG. 3 is along line A—A in FIG. 1, which is parallel to the mid-circumferential plane X—X. The forward F rotation of the tire determines the leading face 8 and the trailing face 9 of the traction tread block 2. The surface area 5 makes contact with the ground or roadway. The lead angle $\alpha1$ is the acute angle between a normal P to surface area 5 and the leading face 8 of the traction tread block 2. The trail angle $\beta1$ is the acute angle between the normal P to surface area 5 and the trailing face 9 of the traction tread block 2. For the embodiment shown, those two angles are equal, or $\alpha1 = \beta1$. Situations for not having these angle equal are discussed above. The included angle of the groove ($\alpha1 + \beta1$) is in a range of approximately 15 to 25 degrees for this invention.

The groove width G1 is determined that gives proper tire traction with as large a contact surface ratio (CSR) as possible. To compute CSR, the total contact area is the surface of the tire defined by a smooth surface containing all or part of the surface areas 4 and 5 of the tread blocks 2 and 3. The contact surface ratio for the tread designs of this invention are in a range of approximately 0.55 to 0.85.

The tread depth T, the groove width G1 and the groove angles $\alpha1$ and $\beta1$ determine the width at the bottom of the groove available for differential strain between the training face 9 and the leading face 8. Stress concentrations at this groove bottom produce endurance problems due to fatigue cracks. Various configurations of the groove bottom are possible. This invention discloses a method for obtaining a uniform circular groove bottom in a plane parallel to the principal tangential stresses on the surface area 5 of the traction tread block 2 as a result of drive axle torque. This plane is the same as that showing the sectional view of FIG. 3. Additional details of this method are discussed below.

Figure 4:
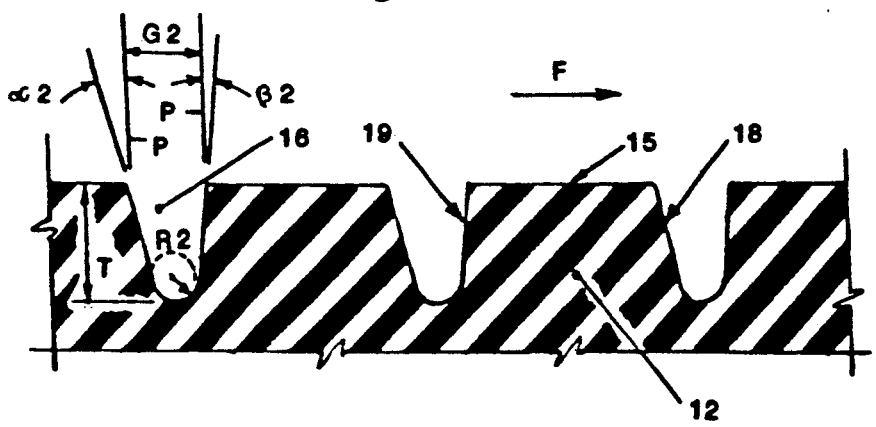
FIG. 4 is a sectional view of the tread area segment along line C—C parallel to the mid-circumferential plane X—X for the uni-directional tread design of FIG. 2.

The sectional view of FIG. 4 shows more details on the configuration of the traction tread blocks 12 and their associated lateral grooves 16 for the uni-directional tread design 11. The sectional view of FIG. 4 is along line C—C in FIG. 2, and is parallel to the mid-circumferential plane X—X. The forward F direction defines a leading face 18 and a trailing face 19 of a traction tread block 12. The surface area 15 makes contact with the ground or roadway. A lead angle $\alpha2$ is the acute angle between the leading face 18 and a normal P to the surface area 15. A trail angle $\beta2$ is the acute angle between the trailing face 19 and a normal P to the surface area 15. The lead angle $\alpha2$ defines the configuration of the traction tread block 12 as it comes into contact with the ground or roadway and the trail angle $\beta2$ defines the configuration or the tread block 12 as it releases from contact with the ground or roadway. A majority of the prior art lead the inventor to initially design a tread with a $\beta2 > \alpha2$. However, the unexpected results or experimental testing program disclosed that the preferred embodiment is with $\alpha2 > \beta2$, as shown in this sectional view. These test results are discussed below. The included angle of the groove ($\alpha2 + \beta2$) is in a range of values of approximately 15 to 25 degrees for this preferred embodiment.

The groove width G2 is determined that gives proper tire traction with as large a contact surface ratio (CSR) as possible. To compute CSR, the total contact area is the surface of the tire defined by a smooth surface containing all or part of the surface areas 14 and 15 of the tread blocks 12 and 13. The contact surface ratio for the preferred tread design of this invention are in a range of approximately 0.55 to 0.85.

The tread depth T, the groove width G2 and the groove angles $\alpha2$ and $\beta2$ determine the width at the bottom of the groove available to allow the differential strain between a trailing face 19 and a leading face 18. These strains are large at the leading edge of contact with the ground or roadway and at the trailing edge of contact; especially during high tractive torque of the drive axle tire. The resulting stress concentrations at the bottom of the groove produce endurance problems due to fatigue. Various configurations of the groove bottom are possible. Experimental results discussed below show that a uniform circular groove bottom has superior endurance over other configurations. This invention discloses a method for obtaining a uniform circular groove bottom in a plane parallel to the tangential stress on the surface area 15 of the traction tread blocks 12 as a result of drive axle or brake torque. This plane is the same as that showing the sectional view of FIG. 4. Additional details of this method are discussed below.

Figure 5:
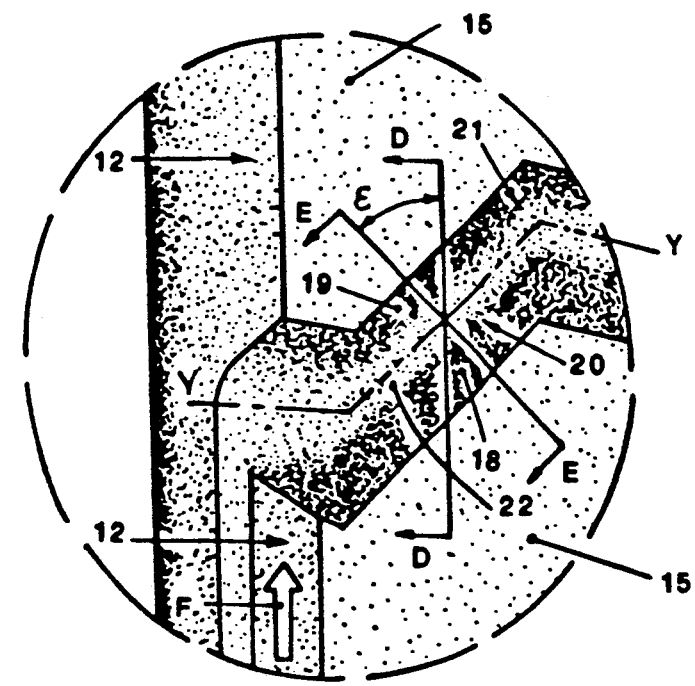
FIG. 5 is an expanded view of the uni-directional tread design and is defined by the circle V of FIG. 2 whereby it shows the lateral groove in more detail.
Figure 6:
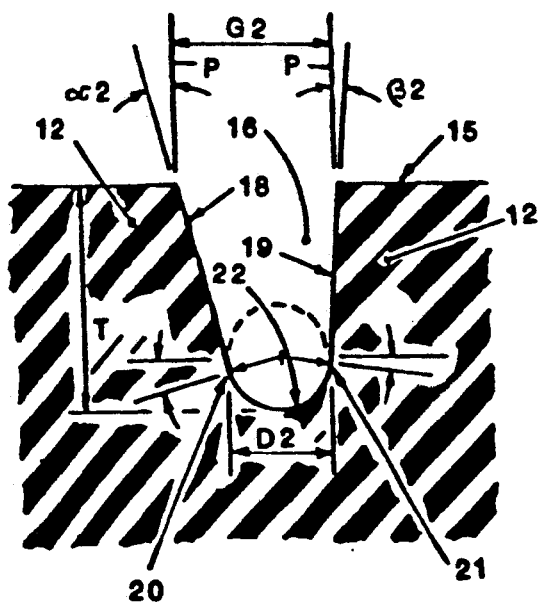
FIG. 6 is a sectional view along the line D—D in FIG. 5 showing details of the groove profile in a plane parallel to the mid-circumferential plane X—X of the tire.
Figure 7:
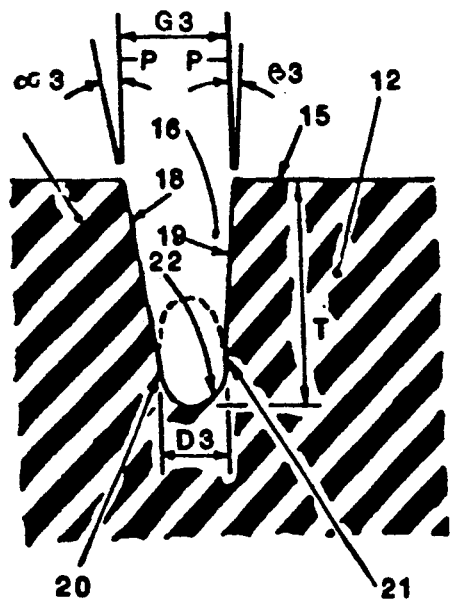
FIG. 7 is a sectional view along the line E—E in FIG. 5 showing details of the groove profile in a plane normal to the line Y—Y defining the axis of the groove.

The expanded view of a segment of the top view of the uni-directional tire of FIG. 2 is illustrated in FIG. 5. This expanded view shows additional details of the lateral groove 16 near the shoulder area of the tire, and is typical of the lateral grooves at all locations for this preferred embodiment. With the proper forward F rotation defined by an arrow on the should of the tire traction tread block 12, the leading face 18 has a projected area large than that of the trailing face 19. The bottom of the groove is located along the line Y—Y defining the axis of the groove. The groove bottom surface area 22 is tangent to the leading face 18 along a line shown as a dashed line 20 and tangent to the trailing face 19 along a line shown as a dashed line 21. The shape of this bottom surface area 22 is critical in controlling the stress concentrations that produce fatigue cracks, as mentioned above. To provide resistance to the tangential stress on the surface area 15 due to tractive efforts of driving or braking, a uniform circular groove bottom is constructed in a plane defined by section line D—D, which is parallel to the mid-circumferential plane X—X of FIG. 2. The method to accomplish this is to contour the bottom surface area 22 as an ellipse in the plane defined by section line E—E, which is normal to groove axis line Y—Y and has a groove angle $\epsilon$ with respect to section line D—D. Details of this bottom surface area 22 contour are illustrated in FIG. 6 and 7. A discussion of these details follows.

A sectional view of a typical lateral groove 16 is illustrated in FIG. 6. This section is defined by section line D—D in FIG. 5 which is parallel to the mid-circumferential plane X—X of FIG. 2. The leading face 18 has a lead angle $\alpha 2$ with respect to a normal P to the surface area 15. The trailing face 19 of the traction tread block 12 was a trail angle $\beta 2$ with respect to a normal P to the surface area 15. The circular bottom surface area 22 in the sectional view is tangent to the leading face 18 at the point 20 (dashed line 20 in FIG. 5). The groove width G2, depth T and angles $\alpha 2$ and $\beta 2$ of each groove face determine the circular radius R2 for the bottom surface area 22. The groove bottom width D2 parallel to the surface area 15 between tangent points 20 and 21 is given by the equation $$D2 = R2 (\cos \alpha 2 + \cos \beta 2).$$

With $\alpha 2 = 15$ degrees and $\beta 2 = 5$ degrees the equation gives $D2 = 1.962 R2$, or only slightly less than the diameter of the circle defining the bottom surface area 22. Values for groove width G2, groove depth T lead angle $\alpha 2$ and trail angle $\beta 2$ vary over the preferred tread design 11 of FIG. 2. The result is a variation in the groove bottom width D2 over a range of values of approximately 4 to 9 millimeters.

A sectional view of a typical lateral groove is perpendicular to the groove axis line Y—Y is illustrated in FIG. 7. This section is defined by section line E—E in FIG. 5. This section is at a groove angle $\epsilon$ with respect to the mid-circumferential plane X—X of FIG. 2. The slope of the leading face 18 has an lead angle $\alpha 3$ with respect to the normal P to the surface area 15. The slope of the trailing face 19 has a trail angle $\beta 3$ with respect to the normal P to the surface area 15. The relationship between the lead and trail angles $\alpha 3$ and $\beta 3$ of this section along line E—E E and the lead and trail angles $\alpha 2$ and $\beta 2$ of the section along line D—D of FIG. 5 is as follows:

$$\text{Tan } \alpha 3 = \text{Tan } \alpha 2 \times \cos \epsilon$$

and $$\text{Tan } \beta 3 = \text{Tan } \beta 2 \times \cos \epsilon$$

When the lateral groove is perpendicular to the mid-circumferential plane X—X of FIG. 2, the groove angle $\epsilon$ is zero and $\alpha 3 = \alpha 2$ plus $\beta 3 = \beta 2$. The bottom surface area 22 in this sectional view is an ellipse with its major axis in a radial direction and is tangent to the leading face 18 at the point 20 (dashed line 20 in FIG. 5) and also tangent to the trailing face 19 at the point 21 (dashed line 21 in FIG. 5). The groove width G 3, depth T and angles $\alpha 3$ and $\beta 3$ of each groove face determine the elliptical bottom surface area 22. The groove bottom width D3 parallel to the surface area 15 between tangent points 20 and 21 is determined from this same groove bottom width D2 of FIG. 6 as follows:

$$D3 = D2 \times \cos \epsilon$$

or $$D3 = R2 \times [\cos \alpha 2 + \cos \beta 2] \times \cos \epsilon$$

in terms of the circular radius R2 of FIG. 6. Values for groove width G2, groove depth T, lead angle $\beta 3$ and trail angle $\beta 3$ vary over the preferred tread design 11 of FIG. 2. The result is a variation in the groove bottom width D3 over a range of values of approximately 3 to 8.5 millimeters.

Classically the groove bottom contour 22 is circular in this sectional view of FIG. 7. This invention discloses a method to change this to an ellipse (see FIG. 7) which yields a smooth circle in the direction of maximum tractive stress, which is the sectional view direction as shown in FIG. 6. This direction is essentially parallel with the mid-circumferential plane X—X of FIG. 2.

The detailed description and preferred embodiments of the invention have been reduced to practice, as evidenced by the experiment results discussed below.

EXPERIMENTAL RESULTS AND BEST MODE

Based on the teaching of a majority of reference information available at the conception of this invention, the inventor conducted tests on a non-directional tire, shown as tread design 1 of FIG. 1, as well as a uni-directional tire similar to the tread design 11 of FIG. 2. The difference in the uni-directional tread design was that the slope angle with respect to a normal to the surface area of the leading face was less than the slope angle of the trailing face. That is, slope angle $\beta$ is larger than slope angle $\alpha$ in FIG. 4. This uni-directional tread design was also tested with a backward rotation so the larger slope angle $\beta$ was on the leading face of each tread block. Test results were obtained using a standard 4×2 (single drive axle) tractor-trailer configuration, and the project tire life was calculated based on wear rates after each test cycle. These results are shown in the table below

| TREAD DESIGN ROTATION REL. SLOPE | RELATIVE PROJECTED TIRE LIFE 4 × 2 TRACTOR DRIVE AXLE | | | | |
|---|---|---|---|---|---|
| | TOTAL MILES | | | | |
| | TEST MILES (TM) | 2 × TM | 3 × TM | 4 × TM | 5 × TM |
| Non-directional either | 152 | 143 | 142 | 140 | 138 |

-continued

RELATIVE PROJECTED TIRE LIFE
4 × 2 TRACTOR
DRIVE AXLE

| TREAD DESIGN ROTATION REL. SLOPE | TEST MILES (TM) | TOTAL MILES | | | |
|---|---|---|---|---|---|
| | | 2 × TM | 3 × TM | 4 × TM | 5 × TM |
| rotation $\beta1 = \alpha1$ uni-directional forward $\beta2 > \alpha2$ | 127 | 135 | 140 | 138 | 132 |
| uni-directional backward $\beta2 > \alpha2$ | 100* | 109 | 119 | 129 | 136 |

*base for comparison

The results were unexpected, as the uni-directional tread design with backward rotation was the projected best tire tread design. The results steadily improved for this tread design and rotation, and it maintain its superiority in the final analysis. Based on these results, and the results of the uni-directional tread design in a forward rotation having better wet and dry traction, a second test was conducted. This test involved a commercial fleet of 4×2 tractor-trailer configurations having uni-directional tread design tires on their drive axle. Approximately half of the tires had the relative slope angle where $\beta > \alpha$ and the others were with $\alpha > \beta$ as per the sectional view of FIG. 4. The total fleet average projected tire life was 35% greater for the $\alpha > \beta$ tread design. That is, the leading face having an angle with respect to a normal to the surface area larger than the same angle for the trailing face is clearly superior.

To confirm these experimental results and enforce the conclusions, a series of tests were conducted using a 6×4 (tandem drive axle) tractor-trailer configuration. The uni-directional tread design was used and three options were considered. The first option was with $\beta > \alpha$ and a forward rotation of the tire. The second option was with $\alpha > \beta$ and a forward rotation, where the third option was the same tire having $\alpha > \beta$ but rotated backward. The first and third options have the slope angle of the leading face less than the slope angle of the trailing face. The table below shows the result of this series for the second and third drive axles of the 6×4 tractor-trailer.

RELATIVE PROJECTED TREAD LIFE
6 × 4 TRACTOR
DRIVE AXLES

| TREAD DESIGN ROTATION relative slope | TEST MILES (TM) | TOTAL MILES | | | |
|---|---|---|---|---|---|
| | | 2 × TM | 4 × TM | 6 × TM | 8 × TM |
| 2nd AXLE | | | | | |
| uni-directional forward $\beta2 > \alpha2$ | 103 | 180 | 149 | 114 | 88 |
| uni-directional forward $\alpha2 > \beta2$ | 111 | 145 | 156 | 166 | 170 |
| uni-directional backward $\alpha2 > \beta2$ | 100* | 170 | 179 | 172 | 148 |
| 3rd AXLES | | | | | |
| uni-directional forward $\beta2 > \alpha2$ | 100 | 143 | 131 | 115 | 96 |
| uni-directional forward $\alpha2 > \beta2$ | 97 | 123 | 128 | 124 | 123 |
| uni-directional backward $\alpha2 > \beta2$ | 100* | 143 | 138 | 104 | 90 |

*base for comparison

The second option with the leading face lead angle $\alpha$ greater than the trailing face trail angle $\beta$, as shown in FIG. 4, and a forward rotation, had a projected tread life much higher after eight times the base test miles. This superiority was maintained in the final analysis as test miles were increased. These results show a 15 percent advantage for the second drive axle and a 28 percent advantage for the third drive axle. Results after fewer test miles showed the other options to be superior. Without adequate total mileage a proper conclusion was not possible. This reversal was not predictable and was very unexpected. Therefore, the preferred embodiment is the tread design 11, shown in FIG. 2, and a forward rotation was the best mode of operation for improved tire life. Other performance parameters were verified to have high or higher results for snow, wet and dry traction, rolling resistance, casing endurance and noise abatement than other recent drive axle tire designs.

Experimental testing to verify the improved endurance of this non-directional tire utilized a roadwheel endurance test machine. The endurance improvement involved fatigue at the bottom of the lateral grooves parallel to the groove axis Y—Y, as shown in FIG. 5. Tread life and endurance must be considered simultaneously, as having one is not any good without the other. Also, what tread design change is done to obtain improvements in tread life impacts the endurance.

The conventional tire mold design and construction to obtain a desired sculpture forms the groove bottom area as a circular surface perpendicular to the minimum width axis of the groove (defined by line Y—Y in FIG. 5). This results in an elliptical shaped groove bottom area in a plane parallel to the mid-circumferential plane of the tire. The major axis of this ellipse is horizontal resulting in a relatively flat spot in the center of the groove bottom area and a sharp turnup at the tangent lines on each side between the tread block leading and trailing faces and the groove bottom area.

Initial test results on the endurance machine compared the conventional design described above with a design where a larger flat area was formed at the bottom of the groove and the turnup at each side of the groove bottom was more abrupt than the conventional design. This flat bottom design was easy to build using modified existing tire molds. The trend was as expected, with a delay in the initiation of visible cracks by 80,000 miles for the conventional groove bottom configuration compared with the flatter bottom configuration. This data enforces the concept of the smooth circular bottom groove configuration of this invention.

The concept of this invention is the groove bottom configuration designed as shown in FIGS. 6 and 7. This concept has been tested and compared with the conventional design. Analysis and experience of the inventor allows him to anticipate or prophesy a delay in the initiation of visible cracks by an additional 15,000 to 20,000 miles for the disclosed circular groove bottom configuration compared with the conventional design. This design endurance improvement is consistent with the improved tread life of this invention.

While the present invention has been disclosed with the preferred embodiment and best mode defined, it should be understood that there may be other embodiments which fall within the spirit and scope of the invention as defined by the following claims.

What is claimed is:

1. A tire for a driving axle of a transport vehicle having a tread, two sidewalls, two beads, a radial carcass and a tread reinforcement with at least two belt plies of cables being parallel in each ply and crossed from one ply to the adjacent ply, characterized by said tread portion comprising:
    a) a plurality of polygonal traction tread blocks and center tread blocks separated by approximately straight circumferential grooves connected adjacent lateral grooves, and offset from each other at adjacent tread blocks in a zigzag nature, and approximately zigzag lateral grooves such that a contact surface ratio between approximately 0.65 and 0.85 is provided at full tread depth;
    b) said lateral grooves defining a leading face and a trailing face of each said traction tread block where a lead angle of inclination of said leading face with respect to a first radial direction normal to a surface area of said traction tread block is larger than a trail angle of inclination of said trailing face with respect to a second radial direction also normal to said surface area of said traction tread block whereas an included angle between said leading face and said trailing face is in a range of values of approximately 15 degrees to 25 degrees; and
    c) said lateral grooves further having a most radially inward bottom surface area or base configuration comprising a smooth transition with said leading and trailing faces, said bottom surface area of said lateral grooves being formed in a ellipse, with its major axis in a radial direction, in a plane containing a minimum width dimension of said lateral groove which is perpendicular to an axis of said lateral groove, whereby said ellipse is defined to yield a circular section in a plane parallel to the mid-circumferential plane of said tire and whereby said tread will have a uniform wear pattern with improved wear rates as well as endurance improvements due to a reduction in the stresses that produce fatigue.

2. A tire for a driving axle of a transport vehicle having a tread, two sidewalls, two beads, a radial carcass and a tread reinforcement with at least two belt plies of cables being parallel in each ply and crossed from one ply to the adjacent ply, characterized by said tread portion comprising
    a) a plurality of polygonal traction tread blocks and center tread blocks separated by approximately straight circumferential grooves connecting adjacent lateral grooves, and offset from each other at adjacent read blocks in a zigzag nature, and approximately zigzag lateral grooves such that a contact surface ratio between approximately 0.65 and 0.85 is provided at full tread depth, said polygonal traction tread blocks further comprising the same configuration spaced outwardly in both axial directions an equal distance from the mid-circumferential line of the tread width and circumferentially at an offset position around the tire to produce a unidirectional tire with a defined direction of rotation to maintain wear and stress improvements;

said lateral grooves defining a leading face and a trailing face of each said traction tread block where a lead angle of inclination of said leading face with respect to a first radial direction normal to a surface area of said traction tread block is larger than a trail angle of inclination of said trailing face with respect to a second racial direction also normal to said surface area of said traction tread block, whereas an included angle between said leading face and said trailing face is in a range of values of approximately 15 degrees to 25 degrees; and said lateral grooves further having a most radially inward bottom surface area or base configuration comprising a smooth transition with said leading and trailing faces, said bottom surface area of said lateral grooves being formed in a ellipse, with its major axis in a radial direction, in a plane containing a minimum width dimension of said lateral groove which is perpendicular to an axis of said lateral groove, whereby said ellipse is defined to yield a circular section in a plane parallel to the mid-circumferential plane of said tire and whereby said tread will have a uniform wear pattern with improved wear rates as well as endurance improvements due to a reduction in the stresses that produce fatigue.

3. The tire tread according to claim 1 wherein the said lateral grooves have a width that is variable such that a bottom width measured parallel to said surface area of said traction tread block between tangent points of said ellipse with said leading face and said trailing face, is in a range of values of approximately 3 to 8.5 millimeters.

4. The tire tread according to claim 2 wherein said lateral grooves have a width that is variable such that a bottom width measured parallel to said surface area of said traction tread block between tangent points of said ellipse with said leading face and said trailing face, is in a range of values of approximately 3 to 8.5 millimeters.

* * * * *

UNITED STATES PATENT AND TRADEMARK OFFICE
CERTIFICATE OF CORRECTION

PATENT NO. : 5,127,455

DATE : 7 July 1992

INVENTOR(S) : Edward M. Remick and John T. Melson

It is certified that error appears in the above–identified patent and that said Letters Patent is hereby corrected as shown below:

ON THE TITLE PAGE

[75] Inventors: Edward M. Remick, Greer, S.C.

-- and John T. Melson, Simpsonville, S.C. --

Signed and Sealed this

Tenth Day of August, 1993

Attest:

MICHAEL K. KIRK

*Attesting Officer*  Acting Commissioner of Patents and Trademarks